(12) United States Patent
Palisoc et al.

(10) Patent No.: US 12,431,607 B2
(45) Date of Patent: *Sep. 30, 2025

(54) COMPACTABLE RF MEMBRANE ANTENNA

(71) Applicant: L'Garde, Inc., Tustin, CA (US)

(72) Inventors: Arthur Libornio Palisoc, Irvine, CA (US); Linden Bolisay, Tustin, CA (US)

(73) Assignee: L'Garde, Inc., Tustin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,189

(22) Filed: Nov. 20, 2023

(65) Prior Publication Data

US 2024/0088539 A1 Mar. 14, 2024

Related U.S. Application Data

(63) Continuation of application No. 17/654,943, filed on Mar. 15, 2022, now Pat. No. 11,870,128, which is a continuation of application No. 16/842,660, filed on Apr. 7, 2020, now Pat. No. 11,316,242, which is a continuation of application No. 16/080,977, filed as application No. PCT/US2017/020056 on Feb. 28, 2017, now Pat. No. 10,651,531.

(Continued)

(51) Int. Cl.
| | |
|---|---|
| *H01Q 1/08* | (2006.01) |
| *B64G 1/22* | (2006.01) |
| *B64G 1/66* | (2006.01) |
| *H01Q 1/28* | (2006.01) |
| *H01Q 15/16* | (2006.01) |

(52) U.S. Cl.
CPC ............. *H01Q 1/08* (2013.01); *B64G 1/2222* (2023.08); *B64G 1/66* (2013.01); *H01Q 1/288* (2013.01); *H01Q 15/161* (2013.01); *B64G 1/2227* (2023.08)

(58) Field of Classification Search
CPC ......... H01Q 1/08; H01Q 1/288; H01Q 15/161
See application file for complete search history.

(56) References Cited

U.S. PATENT DOCUMENTS

| | | | |
|---|---|---|---|
| 3,175,619 | A | 3/1965 | Reed, Jr. |
| 3,354,458 | A | 11/1967 | Rottmayer |

(Continued)

FOREIGN PATENT DOCUMENTS

| | | |
|---|---|---|
| CH | 666235 | 7/1988 |
| CN | 104393421 | 3/2015 |

(Continued)

OTHER PUBLICATIONS

Extended European Search Report for European Patent Application No. 20798150, dated Dec. 21, 2022, 9 pages.

(Continued)

*Primary Examiner* — Hoang V Nguyen
(74) *Attorney, Agent, or Firm* — Kari L. Barnes

(57) ABSTRACT

Exemplary embodiments are described herein for compactable antennas. Exemplary compactable antennas include a support structure and a reflector surface. The support structure may directly or indirectly define the reflector shape. Exemplary embodiments comprise deployable support structures to permit the compactable antenna to have a smaller volume stowed configuration and a larger volume deployed configuration.

9 Claims, 5 Drawing Sheets

Related U.S. Application Data

(60) Provisional application No. 62/301,486, filed on Feb. 29, 2016.

(56) References Cited

U.S. PATENT DOCUMENTS

| | | | |
|---|---|---|---|
| 3,521,290 | A | 7/1970 | Bahiman et al. |
| 3,780,375 | A | 12/1973 | Cummings et al. |
| 4,033,225 | A | 7/1977 | Kartzmark, Jr. |
| 4,092,453 | A | 5/1978 | Jonda |
| 4,171,876 | A | 10/1979 | Wood |
| 4,262,867 | A | 4/1981 | Piening |
| 4,475,323 | A | 10/1984 | Schwartzberg et al. |
| 4,557,083 | A | 12/1985 | Zanardo |
| 4,587,777 | A | 5/1986 | Vasques |
| 4,647,329 | A | 3/1987 | Oono |
| 4,745,725 | A | 5/1988 | Onoda |
| 4,759,517 | A | 7/1988 | Clark |
| 4,820,170 | A | 4/1989 | Redmond et al. |
| 4,852,307 | A | 8/1989 | Goudeau |
| 5,042,390 | A | 8/1991 | Schotter |
| 5,085,018 | A | 2/1992 | Kitamura et al. |
| 5,163,262 | A | 11/1992 | Adams |
| 5,184,444 | A | 2/1993 | Warden |
| 5,451,975 | A | 9/1995 | Miller |
| 5,507,451 | A | 4/1996 | Karnish |
| 5,615,847 | A | 4/1997 | Bourlett |
| 5,680,145 | A | 10/1997 | Thomson et al. |
| 5,979,833 | A | 11/1999 | Eller |
| 6,028,570 | A | 2/2000 | Gilger et al. |
| 6,260,797 | B1 | 7/2001 | Palmer |
| 6,286,410 | B1 | 9/2001 | Leibolt |
| 6,508,036 | B1 | 1/2003 | Cadogan |
| 6,568,640 | B1 | 5/2003 | Barnett |
| 6,640,739 | B2 | 11/2003 | Woodall |
| 6,647,668 | B1 | 11/2003 | Choee et al. |
| 6,655,637 | B1 | 12/2003 | Robinson |
| 6,830,222 | B1 | 12/2004 | Nock |
| 6,904,722 | B2 | 6/2005 | Brown |
| 7,104,507 | B1 | 9/2006 | Knight |
| 7,941,978 | B1 | 5/2011 | Pollard |
| 8,056,461 | B2 | 11/2011 | Bossert |
| 8,115,149 | B1 | 2/2012 | Manole |
| 8,356,774 | B1 | 1/2013 | Banik et al. |
| 8,511,298 | B2 | 8/2013 | Ven |
| 8,770,522 | B1 | 7/2014 | Murphey et al. |
| 9,146,043 | B2 | 9/2015 | Pedretti |
| 9,187,191 | B1 | 11/2015 | Jensen |
| 9,296,270 | B2 | 3/2016 | Parks |
| 9,499,285 | B2 | 11/2016 | Garber |
| 9,666,948 | B1 | 5/2017 | Rao et al. |
| 9,742,058 | B1 | 8/2017 | O'Neil, Jr. |
| 9,755,318 | B2 | 9/2017 | Mobrem |
| 9,810,820 | B1 | 11/2017 | Starkovich |
| 9,828,772 | B2 | 11/2017 | Murphey et al. |
| 10,036,878 | B2 | 7/2018 | Greschik |
| 10,347,962 | B1 | 7/2019 | Georgakopoulos |
| 10,642,011 | B2 | 5/2020 | Greschik et al. |
| 10,651,531 | B2 | 5/2020 | Palisoc et al. |
| 11,142,349 | B2 | 10/2021 | Barnes |
| 11,316,242 | B2 | 4/2022 | Palisoc et al. |
| 11,713,141 | B2 | 8/2023 | Barnes |
| 11,870,128 | B2 | 1/2024 | Palisoc et al. |
| 11,905,044 | B2 | 2/2024 | Barnes et al. |
| 11,973,258 | B2 | 4/2024 | Bolisay |
| 2002/0112417 | A1 | 8/2002 | Brown |
| 2002/0116877 | A1 | 8/2002 | Breitbach et al. |
| 2003/0010869 | A1 | 1/2003 | Kawaguchi |
| 2003/0010870 | A1 | 1/2003 | Chafer |
| 2003/0132543 | A1 | 7/2003 | Gardner |
| 2004/0085615 | A1 | 5/2004 | Hill |
| 2004/0140402 | A1 | 7/2004 | Wehner |
| 2004/0194397 | A1 | 10/2004 | Brown |
| 2005/0103939 | A1 | 5/2005 | Bischof et al. |
| 2005/0104798 | A1 | 5/2005 | Nolan et al. |
| 2005/0126106 | A1 | 6/2005 | Murphy |
| 2005/0168393 | A1 | 8/2005 | Apostolos |
| 2005/0209835 | A1* | 9/2005 | Ih .................... H01Q 1/288 703/8 |
| 2007/0008232 | A1 | 1/2007 | Weinstein |
| 2007/0145195 | A1 | 6/2007 | Thomson |
| 2008/0035798 | A1 | 2/2008 | Kothera |
| 2008/0228332 | A1 | 9/2008 | Hindle |
| 2009/0001219 | A1 | 1/2009 | Golecki et al. |
| 2009/0002257 | A1 | 1/2009 | de Jong |
| 2009/0114271 | A1 | 5/2009 | Stancel |
| 2009/0124743 | A1 | 5/2009 | Lee |
| 2009/0294595 | A1 | 12/2009 | Pellegrino |
| 2010/0018026 | A1 | 1/2010 | Bassily |
| 2011/0023484 | A1 | 2/2011 | Lu |
| 2011/0252716 | A1 | 10/2011 | Pedretti |
| 2012/0097799 | A1 | 4/2012 | Stone |
| 2012/0205488 | A1 | 8/2012 | Powell |
| 2012/0297717 | A1 | 11/2012 | Keller et al. |
| 2012/0313569 | A1 | 12/2012 | Curran |
| 2013/0069833 | A1* | 3/2013 | Lippincott ............... H01Q 1/08 343/711 |
| 2013/0101845 | A9 | 4/2013 | Hiel |
| 2013/0114155 | A1 | 5/2013 | Eguro |
| 2013/0175401 | A1 | 7/2013 | Starke et al. |
| 2013/0207880 | A1* | 8/2013 | Taylor .................. H01Q 15/20 343/915 |
| 2013/0207881 | A1 | 8/2013 | Fujii et al. |
| 2013/0292518 | A1 | 11/2013 | Lagadec |
| 2014/0030455 | A1 | 1/2014 | Ruschulte |
| 2014/0042275 | A1 | 2/2014 | Abrams et al. |
| 2014/0099853 | A1 | 4/2014 | Condon |
| 2014/0151485 | A1 | 6/2014 | Baudasse et al. |
| 2015/0194733 | A1 | 7/2015 | Mobrem |
| 2015/0336685 | A1 | 11/2015 | Wan |
| 2016/0046372 | A1 | 2/2016 | Barnes et al. |
| 2016/0054097 | A1 | 2/2016 | Sylvia |
| 2016/0130020 | A1 | 5/2016 | Chambert |
| 2016/0136820 | A1 | 5/2016 | Lessing |
| 2016/0159475 | A1 | 6/2016 | Schank |
| 2016/0288453 | A1 | 10/2016 | Mejia-Ariza |
| 2016/0311558 | A1 | 10/2016 | Turse |
| 2016/0361910 | A1 | 12/2016 | Franck, III |
| 2017/0058524 | A1 | 3/2017 | Fernandez |
| 2017/0310014 | A1 | 10/2017 | Liu et al. |
| 2018/0257795 | A1 | 9/2018 | Ellinghaus |
| 2019/0036221 | A1 | 1/2019 | Muesse |
| 2019/0097300 | A1 | 3/2019 | Palisoc |
| 2019/0144141 | A1 | 5/2019 | Barnes |
| 2020/0130872 | A1 | 4/2020 | Spencer |
| 2021/0159604 | A1 | 5/2021 | Palisoc et al. |
| 2022/0181765 | A1 | 6/2022 | Barnes et al. |
| 2022/0388694 | A1 | 12/2022 | Barnes |
| 2022/0402632 | A1 | 12/2022 | Yamamoto et al. |
| 2023/0155545 | A1 | 5/2023 | Bolisay et al. |
| 2023/0399847 | A1 | 12/2023 | Greschik et al. |
| 2024/0025568 | A1 | 1/2024 | Barnes |
| 2024/0088539 | A1 | 3/2024 | Palisoc et al. |
| 2024/0109265 | A1 | 4/2024 | Palisoc et al. |

FOREIGN PATENT DOCUMENTS

| | | |
|---|---|---|
| CN | 204216229 | 3/2015 |
| CN | 104691784 | 6/2015 |
| CN | 106516164 | 3/2017 |
| CN | 105480436 | 7/2017 |
| CN | 106976571 | 7/2017 |
| CN | 107150818 | 9/2017 |
| CN | 111806723 | 11/2021 |
| CN | 110371324 | 3/2022 |
| CN | 112389683 | 5/2022 |
| DE | 1456133 | 6/1965 |
| DE | 3437824 | 4/1986 |
| DE | 10147144 | 2/2003 |
| DE | 102011082497 | 3/2013 |
| EP | 524888 | 1/1993 |
| FR | 3081842 | 12/2019 |
| GB | 2322236 | 8/1998 |
| JP | 60125003 | 7/1985 |
| JP | 2004221897 | 8/2004 |

(56) References Cited

FOREIGN PATENT DOCUMENTS

| | | |
|---|---|---|
| JP | 2014189145 | 10/2014 |
| JP | 2016030486 | 3/2016 |
| JP | 2018104250 | 7/2018 |
| WO | 20120092933 | 7/2012 |
| WO | 20150116280 | 8/2015 |
| WO | 20170151689 | 9/2017 |
| WO | 20200249900 | 12/2020 |
| WO | 20210224572 | 11/2021 |

OTHER PUBLICATIONS

International Search Report and Written Opinion for PCT/US2021/72477 dated Mar. 25, 2022, 10 pages.
International Search Report and Writen Opinion for PCT/US2022/079841 dated Mar. 10, 2023, 7 pages.
Costanza et al, "Design and Characterization of a Small-Scale Solar Sail Deployed by NiTi Shape Memory Actuators", Jun. 2016, Science Direct, All Pages (2016).
Fu Bo et al: "Solar sail technology—a state of the art review," Progress in Aerospace Sciences, vol. 86, Aug. 3, 2016 (Aug. 3, 2016), pp. 1-19.
Jimenez, "Mechanics of Thin Carbon Fiber Composites With a Silicone Matrix," Thesis (2011) California Institute of Technology, <http://thesis.library.caltech.edu/6271/1/ThesisMain.pdf>.
K.Sonoda, "Materials Application for Spacerafi Use in Japan," in IEEE Electrical Insulation Magazine, vol. 8, No. 2, pp. 18-26, Mar.-Apr. 1992, doi: 10.1109/57.127012. (1992).

* cited by examiner

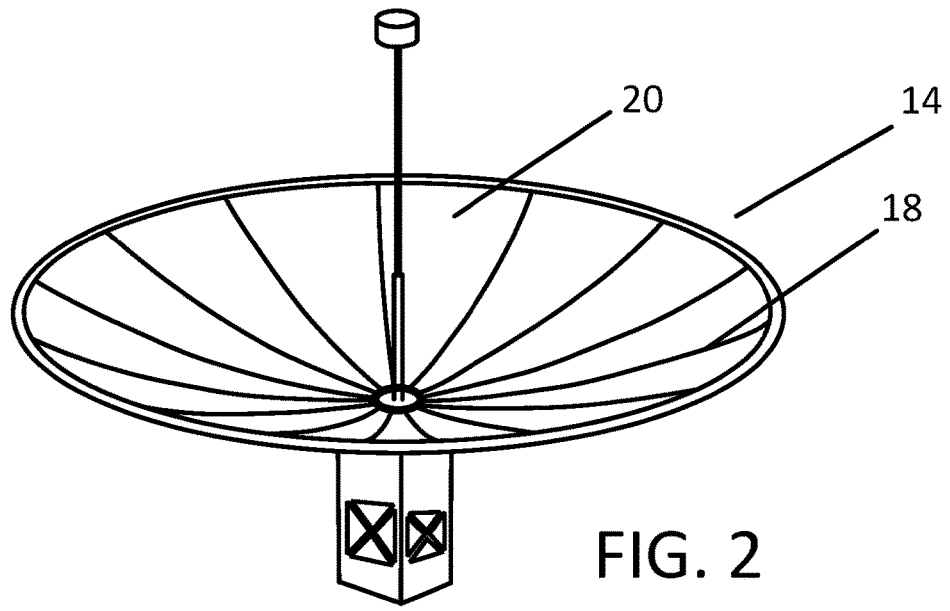
FIG. 2
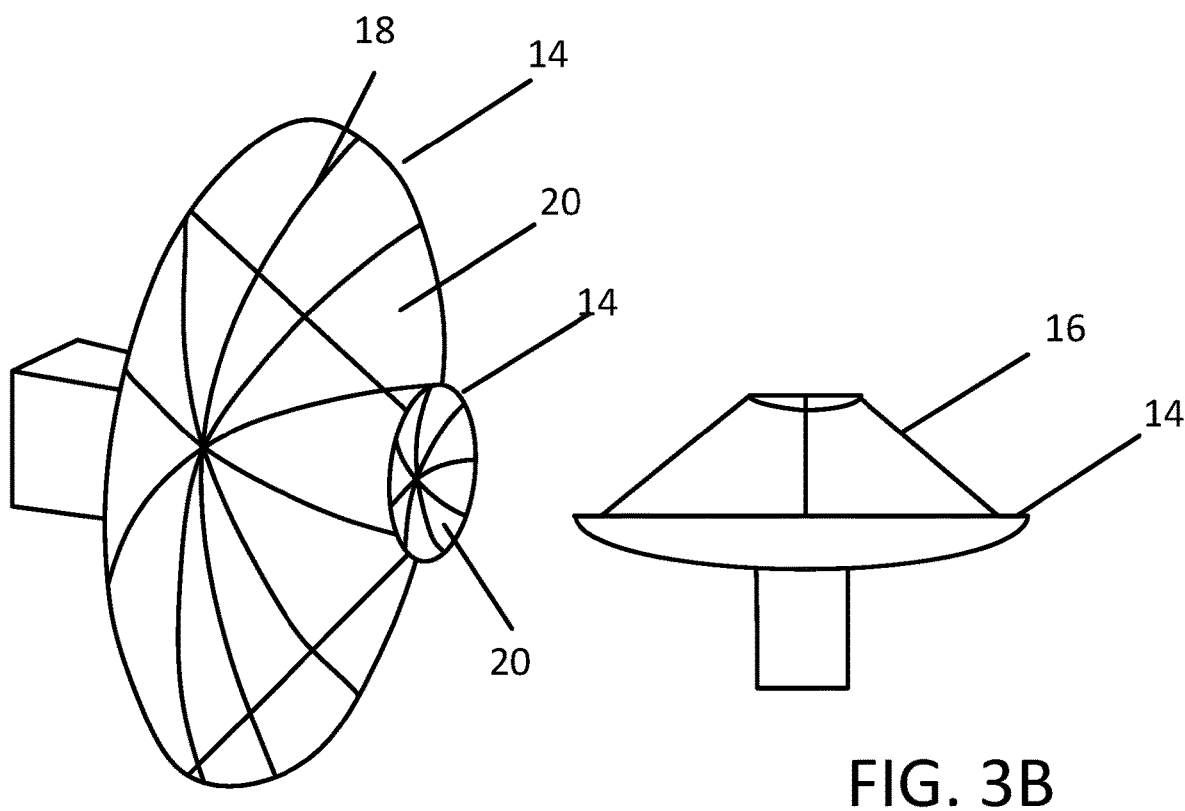
FIG. 3A
FIG. 3B

COMPACTABLE RF MEMBRANE ANTENNA

PRIORITY

This application is a continuation of U.S. patent application Ser. No. 17/654,943, filed Mar. 15, 2022, which is a continuation of U.S. patent application Ser. No. 16/842,660, filed Apr. 7, 2020, now U.S. Pat. No. 11,316,242, which is a continuation of U.S. patent application Ser. No. 16/080,977, filed Aug. 29, 2018, now U.S. Pat. No. 10,651,531, which is a U.S. national stage under 35 USC § 371 of International Application No. PCT/US17/20056, filed Feb. 28, 2017, claiming priority to U.S. Application No. 62/301,486, filed Feb. 29, 2016, each of which is incorporated by reference in their entirety into this application.

BACKGROUND

Large dish antennas have played a substantial role in astronomy, collecting radiofrequency (RF) waves from nearby planets and stars, as well as intergalactic waves from the far reaches of the universe. Their contribution has consisted of data that explain mysteries of the birth of the universe from the earliest moments of the big bang. More recently, they are aiding in the discovery and characterization of exoplanets orbiting stars in our own galaxy.

Concurrently, advances in miniaturizing technology have allowed spacecraft to shrink in size and weight while maintaining capabilities rivaling that of much larger traditional satellites and crafts. However, the sensitivity and resolution of radar antenna detection depends directly on the area of the antenna receiver or dish. So, while other spacecraft components such as high-speed processors, high energy density batteries, solar cells, inertial measurement units, divert and attitude control systems, etc. have shrunk in size and weight in today's smallsats and nanosats, the antenna area must remain large to provide the required performance.

This demand for large area has resulted in new concept designs for RF antennas that maintain large area while allowing for highly compactable storage during launch into space. The antenna must be able to be folded into a small volume in a rocket payload, and, once in space, deploy to its full extent while maintaining an accurate parabolic reflective surface quality and shape that permits the collection of undistorted radio wave information from light years away.

Conventional stowable antennas include pre-formed rigid structures that include discrete positions that permit the segments to fold into a collapsed configuration. By extending the structure by unfolding and locking these joints, the structures defines a desired deployed configuration. For example, rigid sheets may include hinges between sheets to permit the antenna to unfold from a stowed configuration to a deployed configuration. Similarly, a support frame of an antenna structure may include rigid segmented rods that form foldable links. The support frame may be folded at discrete positions in the stowed configuration and unfolded and locked in a deployed configuration.

Conventional stowable antennas that do not include static, pre-formed shapes may include inflatable structures. These structures are essentially balloons in the shape of the desired final form. These systems, however, require additional components for storing and applying the inflation gas or substance to deploy the structure. Therefore, these structures may provide a benefit in not requiring a specific or static stored configuration mandated by preformed and static structures. However, these structures require additional space and weight be dedicated to deployment of the structure.

SUMMARY

Exemplary embodiments are described herein for compactable antennas. Exemplary compactable antennas include a support structure and a reflector surface. The support structure may directly or indirectly define the reflector shape. Exemplary embodiments comprise deployable support structures to permit the compactable antenna to have a smaller volume stowed configuration and a larger volume deployed configuration.

DRAWINGS

The drawings and following associated descriptions are provided to illustrate embodiments of the present disclosure and do not limit the scope of the claims. Corresponding numerals indicate corresponding parts.

FIG. 1, FIG. 2, and FIGS. 3A-3B illustrate exemplary symmetric antenna configurations.

DESCRIPTION OF EXEMPLARY EMBODIMENTS

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments. In addition, embodiments of the inventions can comprise several novel features and no single feature is solely responsible for its desirable attributes or is essential to practicing the inventions herein described.

Although certain aspects, advantages, and features are described herein, it is not necessary that any particular embodiment include or achieve any or all of those aspects, advantages, and features. Some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable. Features may also be integrated or subdivided as necessary, such that the any combination of features, whether integrated, separated, removed, added, duplicated, or otherwise recombined fall within the scope of the instant disclosure.

Exemplary embodiments described may incorporate a shape memory composite defining a support framework, defining a support structure, or integrated into all or a portion of a non-structured collapsible antenna. Although embodiments described herein are in terms of a shape memory composite, exemplary antenna configurations may be novel by themselves. Therefore, the described structure may be made using any conventional deployable antenna material. Exemplary embodiments include two inventive designs for compactable RF antennas comprised of membrane reflectors. These designs are exemplary only and features may be recombined between them as necessary to achieve a given function. Although described in terms of radio frequency (RF) reflectors, exemplary embodiments may be used in other applications, such as reflectors for light or for transmitting/receiving other signals. Exemplary embodiments of the deployable structure may be used in other applications as well.

Figure 1:
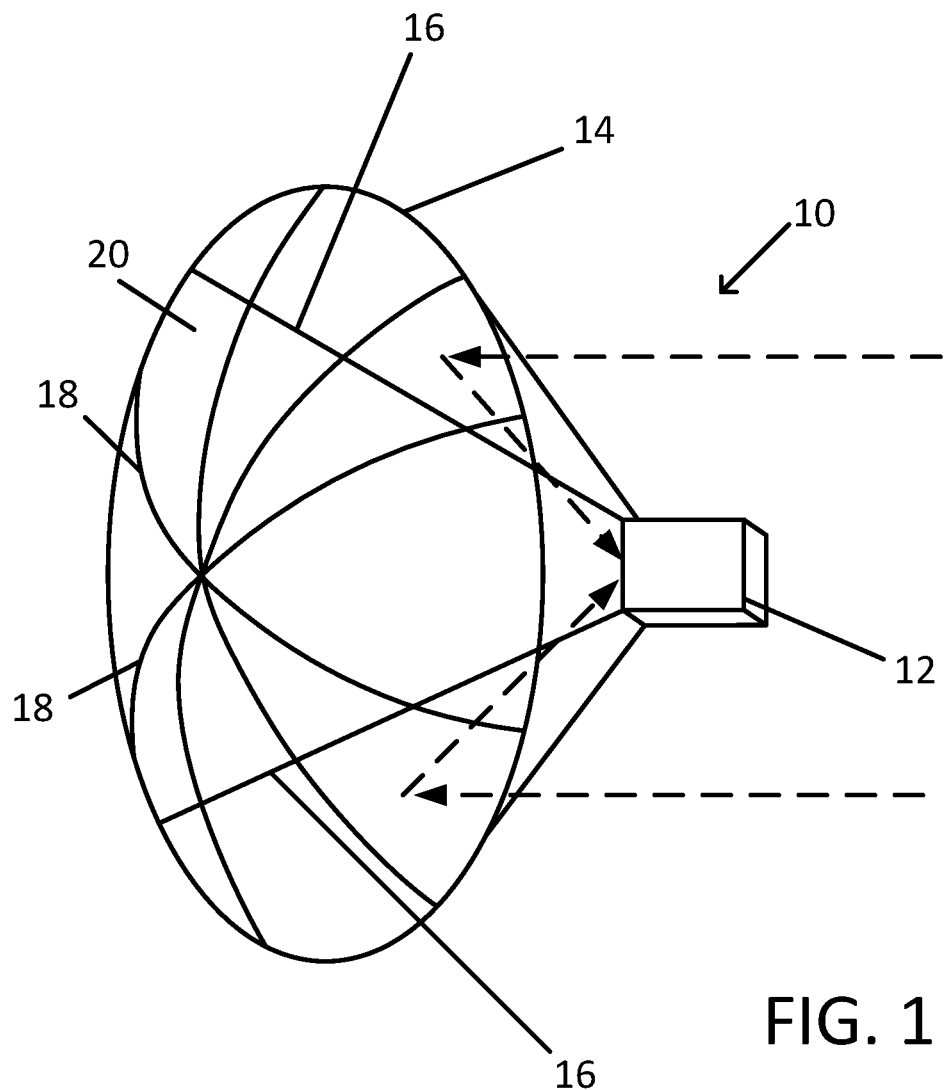
Figure 4:
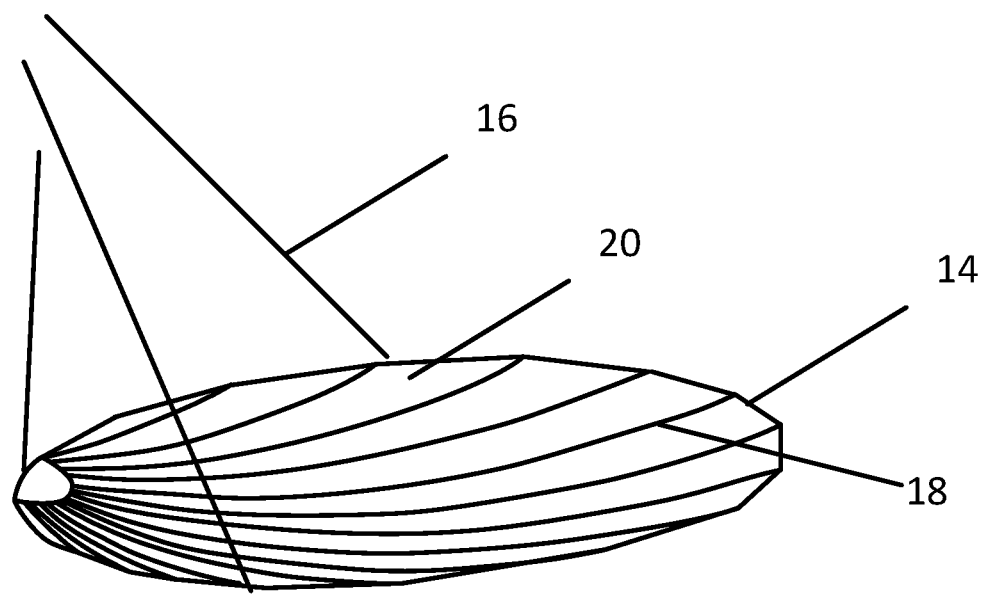
FIG. 4 illustrates an exemplary asymmetric reflector.

FIG. 1 illustrates an exemplary compactable membrane antenna. The antenna 10 includes a reflector 20 configured to receive an RF signal (dashed line) and direct the signal or wave to a collector 12. The shape of the reflector 20 is important to position the reflective surface in a proper location relative to the collector such that the received signal can be properly positioned at the collector. As shown in FIG. 1, a single reflector is used with a collector. However, any combination of reflectors may be used. For example, FIG. 2 illustrates a similar reflector, but the collector is an extended configuration in which a portion of the collector is positioned behind the reflector and a receiving portion is positioned in front of the reflector. Other dual reflector configurations, such as that illustrated in FIGS. 3A-3B may also be used. In this case, a primary reflector is similar to that of FIG. 1, and a secondary reflector is positioned at the receiving location of the primary reflector. The secondary reflector is then configured to direct the received RF signals from the primary reflector to the collector. The collector may be positioned behind the primary reflector with a passage or hole in the primary reflector to permit the RF signal to pass from the secondary collector to the collector. Other reflector configurations may also be used, such as that of FIG. 4 in which the reflector includes an asymmetric configuration. This case may be used when the collector is positioned off axis from the reflector. As shown in FIG. 4, the ribs 18 may extend across substantially an entire chord length from one side of the reflector to the other. As illustrated any configuration of one or more reflectors and collector may be used according to embodiments described herein. The illustrated reflector configurations are exemplary only and not intended to be limiting.

Exemplary reflectors include a support structure such as outer frame 14, ribs 18, and combinations thereof. The support structure supports the reflector 20. The reflector and/or support structure may be coupled to an object, such as the collector or other reflector, by struts 16.

In an exemplary embodiment, the support structure comprises an outer frame 14. The support structure may include any enclosed shapes such as elliptical, circular, polygon, clam shell, etc. The support structure may comprise a curved structure or discrete linear sections angled with respect to adjacent linear sections to approximate a curved surface. Exemplary embodiments include a torus outer frame.

In an exemplary embodiment, the support structure comprises ribs 18. Any number of ribs may traverse the enclosed space within the perimeter of the outer frame. Ribs 18 provide support for the reflective surface of reflector 20. Ribs 18 may be used to define the shape of the reflective surface of reflector 20. Ribs may define a symmetric or asymmetric configuration. As shown in FIGS. 1-3, ribs may attach at one terminal end to the outer frame and extend toward each other to directly or indirectly attach to each other at an opposite terminal end. The ribs may approach a central axis of the outer frame 14 to define a symmetric support structure. The ribs may be curved to define a desired reflective surface of the antenna. As seen in FIG. 3B, the ribs may extend out of the plane of the outer frame 14.

Figure 5:
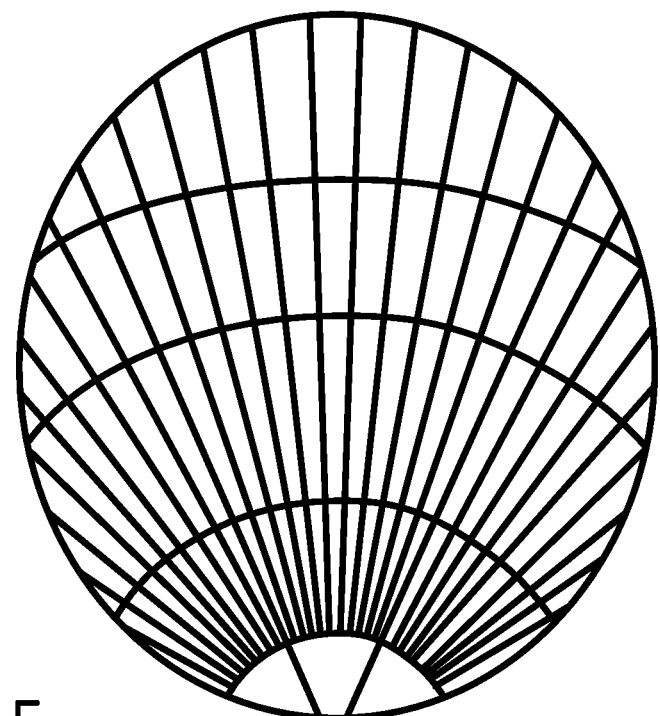
FIG. 5 illustrates an exemplary support structure for a reflector.

The ribs that define the reflector shape, such as an approximate parabolic shape, may be made with a cross section that increases its area moment of inertia for added stiffness such as an I-beam or a T-beam. The stiffness may also or alternatively be increased by the inclusion of cross-ribs coupled between adjacent ribs. FIG. 5 illustrates an exemplary embodiment having cross-ribs for the offset geometry. However, such configuration may also be used for any known or disclosed embodiment.

In an exemplary embodiment, struts 16 may be used to couple component parts. For example, struts may extend between reflectors, between reflectors and collectors, or between any combination thereof or other component. Struts may couple directly or indirectly to the support structure.

In an exemplary embodiment, the support structure, including outer frame 14 and/or ribs 18, and/or struts 16 may comprise a shape memory composite material. The shape memory composite material permits the antenna to collapse under imposition of an outside force in a non-structured fashion. The collapsed configuration may therefore be dynamically determined based on the storage compartment or the outside force applied. For example, the shape memory composite may be flexible or deformable along a length when a force is applied. The shape memory composite, however, returns to a remembered configuration, once the force is removed. Therefore, exemplary embodiments may include a stored configuration in which the support structure is retained in the stored configuration having a reduced storage volume through application of an outside force; and a deployed configuration in which the support structure is fully deployed having a larger storage volume when the outside force is removed. In other words, the remembered or biased configuration may be a deployed configuration in which the support structure is configured for use as an RF reflector. In an exemplary embodiment, the shape memory composite may flex in any direction under application of an outside force. In an exemplary embodiment, the shape memory composite may flex at multiple locations along a length of the member or along an entire length of the member. In an exemplary embodiment, the shape memory composite may return to a remembered configuration, such as linear, circular, ovoid, curved, parabolic, or other predefined shape when the outside force is removed.

An exemplary shape memory composite material includes a base material of one or more of carbon fabric or tows, Vectran, or Kevlar. The base material comprises strands. The strands may be generally aligned along a length of the structure, may include one or more aligned arrangements, may be wound or helically positioned, may be woven, or any combination thereof. The shape memory composite material includes a matrix around and/or between the base material. The matrix may be silicone, urethane, or epoxy. Exemplary shape memory composite materials are described in co-owned patent application U.S. Patent Publication Number 2016/0288453, titled "Composite Material".

In an exemplary embodiment, the reflector may include a flexible membrane having a highly reflective surface. The surface may be created by coating, laminating, depositing, or otherwise attaching a material to the membrane surface or from the membrane surface itself. In an exemplary embodiment, the membrane comprises mylar, kapton, polyurethane-coated nylon (PCN), tedlar, Teflon, other polyimide or plastic materials, and combinations thereof. The reflective coating may include a layer of high conductivity metal, such as aluminum, silver, silver-inconel, and combinations thereof. The membrane may also be made of a conductive material such as foils of aluminum or stainless steel as well as carbon fabric or a conductive mesh. The membrane may also consist of a laminate of a combination of some or all of the above materials. The surface may be coated with a layer of high conductivity metal such as aluminum or silver or silver-inconel. The thickness of the metallization can be between 100 to 2,000 Angstroms.

In an exemplary embodiment, the reflector may include a monolithic surface made of a shape memory composite material laminated with a layer or layers of metallized membrane such as mylar, kapton, polyurethane-coated nylon (PCN), tedlar, Teflon or other polyimide or plastic material. The shape memory composite may be coated with a layer of high conductivity metal such as aluminum or silver or silver-inconel, as described herein. The reflective coating may be directly on the shape memory composite material or on a membrane overlaying the shape memory composite material. In an exemplary embodiment, the monolithic surface of shape memory composite material may replace the struts and/or outer frame of the support structure. Essentially, the monolithic shape memory composite material becomes a self-supporting structure.

In an exemplary embodiment, the reflector element is a packageable membrane coated with a layer of high conductivity metal. The membrane may be mylar, kapton, polyurethanecoated nylon (PCN), tedlar, teflon, or other polyimide or plastic material. The double curvature of the membrane is obtained via the joining of accurately-cut flat gores of the membrane joined by adhesive or material melting at the seams or with the use of direct casting or thermo-forming. The support structures are the toroidal ring, radial, ribs and struts. These are made of composite material consisting of one or a combination of carbon fabric or tows, Vectran, or Kevlar. The matrix of the composite may be silicone, urethane, or epoxy. The support structures are designed and fabricated such that they are collapsible for folding packaging and stowing. They may also be fabricated using shape memory composites. The composite ribs are fabricated to have the curvature necessary to achieve high antenna gain and efficiency. As an example, for a parabolic surface reflector, all the ribs lie on the surface of the paraboloid. For packaging, the toroidal ring, ribs, and struts are folded, similar to a folding umbrella and the reflector membrane stowed between or over the ribs, struts, and toroidal ring. Deployment is effected by allowing the packaged antenna to deploy to its final antenna configuration by releasing the stored strain energy in its packaged (or stowed) configuration. By the very nature of the material of the support structures, their springiness is tailorable up and down the stiffness scale at the time of fabrication.

However, the preferred embodiment of the CoSMeRA reflector design consists of gores of a low-coefficient of thermal expansion polyimide membrane coated with 1,500 angstroms of Silver-Inconel with the support structures made of a foldable shape memory carbon composite material.

In some cases, it may be preferable to have the support structures made of hollow tubes, instead of foldable rods. Their deployment may be initiated by the use of an onboard pump and an inflatant gas such as nitrogen, carbon dioxide, or other inert substances like helium or argon. Other gases may also be used, depending on the mission concept.

In an exemplary embodiment, the shape memory material may be used for all or only portions of the support structure. For example, the reflector outer frame may comprise shape memory material, while the ribs comprise conventional rigid segmented materials. Other combinations of shape memory structures with conventional structures are also contemplated hereby. Therefore, any combination of shape memory composite materials, inflatable materials, rigidizable materials, or rigid materials across any combination of components are contemplated hereby.

Figure 6A:
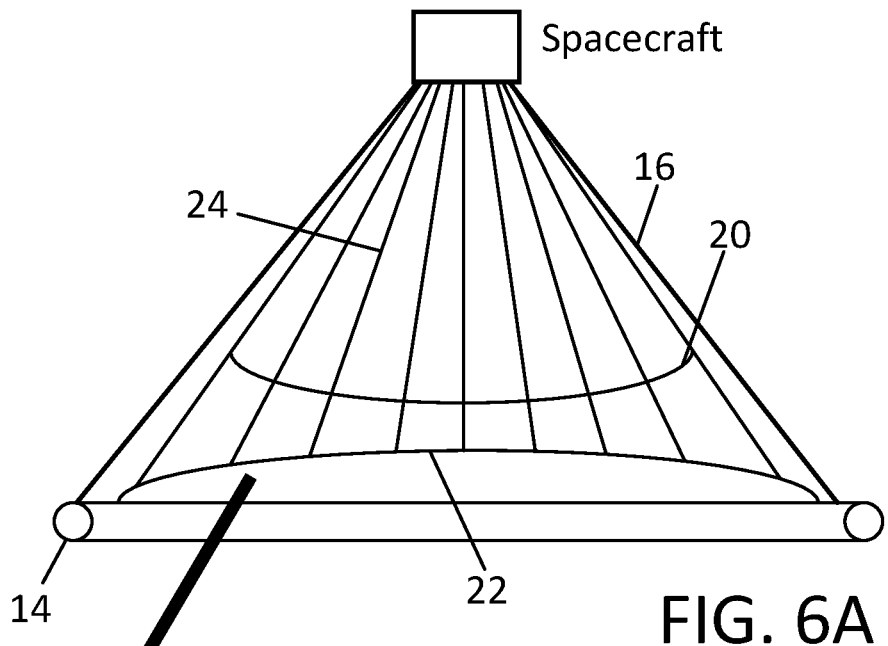
FIG. 6A illustrates an exemplary deployable antenna configuration.

FIG. 6A illustrates an exemplary compactable deployable antenna configuration. As shown a support structure may be created by an outer frame 14 and a plurality of struts 16. The struts extend from the outer frame to the spacecraft or collector (referred to generally as the hub). The outer frame 14 and plurality of struts 16 define the support structure for the reflector 20. The support structure may comprise the shape memory composite as described above or other known material, such as an inflatable, rigidizable, or static foldable structure. As shown, the support structure includes a toroidal outer frame and three struts. However, any number of struts, preferably two to six may be used. The support structure defines an outer envelope or surface for which the reflective surface is fully contained. The support structure is the deployable structure to define the shape of the deployed antenna.

Figure 6B:
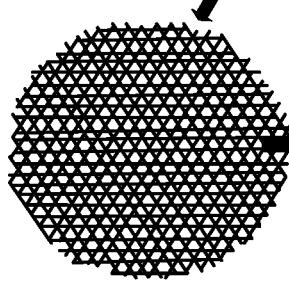
FIGS. 6B-6D illustrate exploded component parts from FIG. 6A.
Figure 6C:
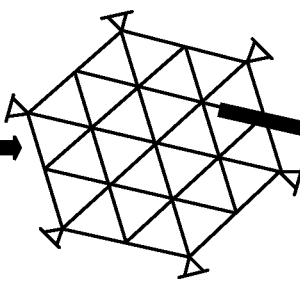
Figure 6D:
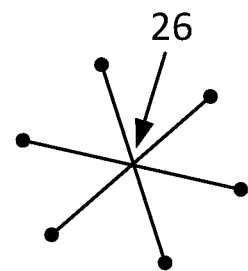
Figure 7:
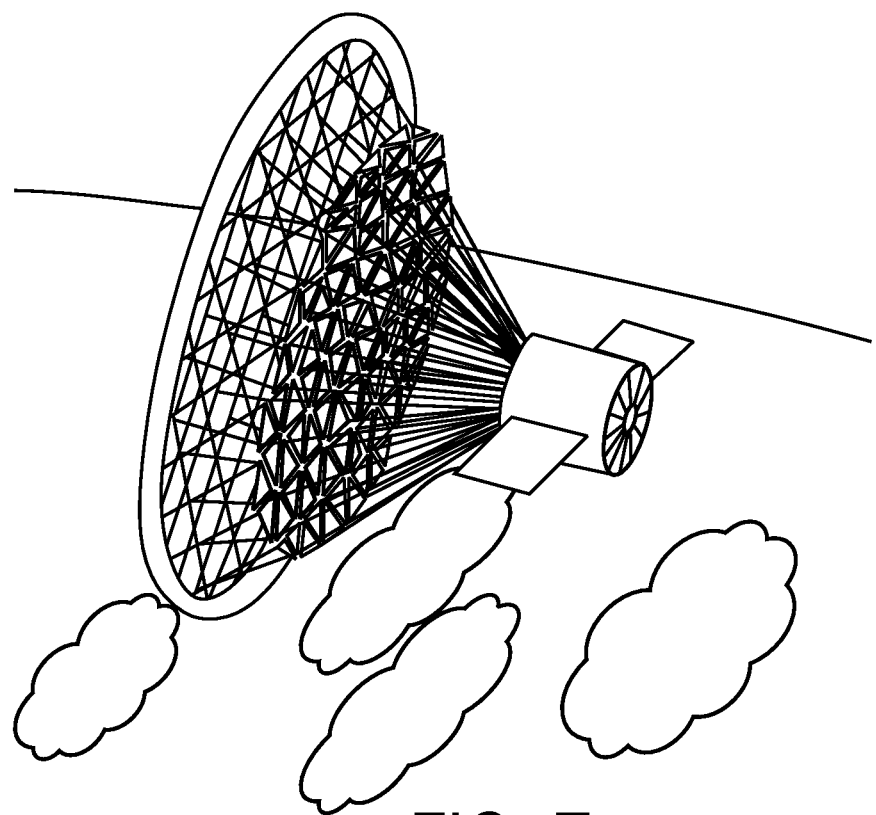
FIG. 7 illustrates an exemplary deployable antenna in a deployed configuration.

The compactable deployable antenna includes a net-mesh 22 enclosed and supported by the outer frame 14. FIG. 6B illustrates an elevated view of the net-mesh, with FIGS. 6C and 6D illustrating blown up views of notes of the net-mesh. The net-mesh may be any flexible material that provides a plurality of nodes 26 for attachment points as described herein. When the outer frame is deployed, the net-mesh is expanded. A plurality of nodes of the net-mesh are coupled to tension elements 24 that extend from the net-mesh to the hub. When the support structure is deployed, the tension elements are under tension and define the surface shape of the net-mesh. The net-mesh may define an out of plane, generally curved structure, from the outer frame, when in a deployed condition. The tension elements may retain the net-mesh toward the hub.

The tension elements may provide supporting structures for reflective membranes. A reflector 20 may therefore be defined within the volume defined by the net-mesh, outer frame, and struts. The reflector 20 may comprise a plurality of panels coupled to the tension elements. The position of the panels may define the reflector shape. The reflector surface may approximate a curved surface by step-wise placement of generally planar panels. The reflector 20 may comprise panels of mylar, kapton, polyurethane coated nylon (PCN) or tedlar coated with a layer of 100 to 1500 Angstroms thick high-conductivity metal such as aluminum, silver, or silver-inconel. Other reflective surfaces as described herein or known by a person of skill in the art may also be used.

In an exemplary embodiment, a highly compactable deployable antenna includes a netmesh with a perimeter toroidal ring support, three or more struts, a plurality of strings (tension ties), a conductive parabolic membrane surface, and combinations thereof (or combinations from other embodiments described herein). Lightweight high stiffness tension elements, strings, are attached to each of the nodes of the net-mesh structure. The other end of each of the strings is attached at its opposite end to the hub. When the strings are tensioned by deployment of the support structure, the net mesh deforms to the desired curved surface as illustrated to define, for example, an inverted net-mesh dome. The curved shape may be any surface of revolution including but not limited to a paraboloid, sphere or a hyperboloid. Exemplary embodiments describing curved surfaces include their approximation by piece-wise planar or linear segments.

Low-stowed volume antennas with aperture diameters on the order of tens of meters, up to 1 00 m diameter can be fabricated using this design.

FIG. 6B illustrates the plan view of the net-mesh invert dome. The reflector surface may consist of triangular conductive facets of mylar, kapton, polyurethane coated nylon (PCN) or tedlar coated with a layer of 100 to 1500 Angstroms thick high-conductivity metal such as aluminum, silver, or silver-inconel. The triangular metallized facets look very similar to that shown in FIG. 6C. Each of the vertices of the metalized triangular facet may be attached to the tensioned string at the appropriate locations to form a desired surface of revolution; e.g. a paraboloid. Because the conductive membrane facets do not have to be stretched to a high film stress, the loads on the support structures (toroidal ring and struts) may be small. This translates to lower mass for the overall system.

The reflector may also be made of accurately-cut flat gores of the metallized membrane joined by adhesive or material melting at the seams or with the use of direct casting or thermoforming.

The support structure may include the toroidal ring and struts. The support structure may be made of composite material consisting of one or a combination of carbon fabric or toes, Vectran, or Kevlar. The matrix of the composite may be silicone, urethane, or epoxy. The support structures are designed and fabricated such that they are collapsible for folding packaging and stowing. They may also be fabricated using shape memory composites. The net mesh of the reflector dome is fabricated to have the curvature necessary to achieve high antenna gain and efficiency. For packaging, the toroidal ring and struts are folded, similar and the reflector membrane stowed between or over the struts, and toroidal ring. Deployment may be effected by the use of either (a) a set of telescoping struts or (b) a set of struts and a toroidal ring, made from shape memory composite material, allowing the packaged antenna to deploy to its final antenna configuration by releasing the stored strain energy in its packaged (or stowed) configuration. By the very nature of the material of the support structures, their springiness may be tailorable up and down the stiffness scale at the time of fabrication.

In an exemplary embodiment, the support structures or portions of the support structures are made of hollow tubes. Deployment of the tubular support structures may be effected by the use of inflatant gas such as nitrogen, carbon dioxide, or other inert substance like helium or argon. Other gases may also be used.

Figure 8A:
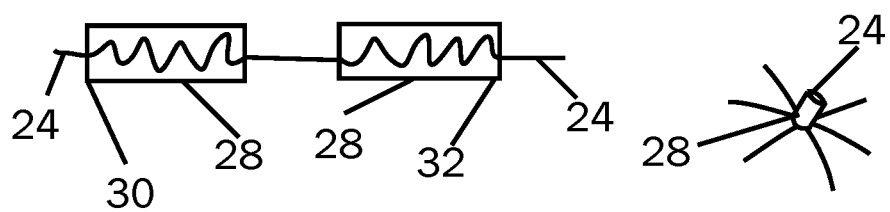
FIGS. 8A-8B illustrate an exemplary stowage component view of FIG. 6A.
Figure 8B:
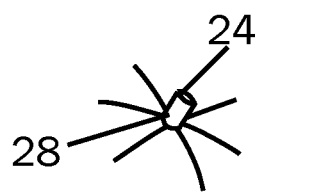

To prevent tangling of the tension elements, each string may be packaged within two enclosures 28, one at the net-mesh end 30, and the other attached at the opposite end 32, proximate the hub, as shown in FIGS. 8A-8B. As the struts are deployed, the strings are pulled out of their enclosure. The enclosure may be any circumferential enclosure, such as a tube. The enclosure may be flexible and deformable, such that it does not have to retain a given shape, but simply separates one string from another.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Conditional language used herein, such as, among others, "can," "could," "might," "may," "e.g.," and the like, unless specifically stated otherwise, or otherwise understood within the context as used, is generally intended to convey that certain embodiments include certain features, elements and/ or states. However, such language also includes embodiments in which the feature, element or state is not present as well. Thus, such conditional language is not generally intended to imply that features, elements and/or states are in any way required for one or more embodiments or that one or more embodiments necessarily exclude components not described by another embodiment. Moreover, the following terminology may have been used herein. The singular forms "a," "an," and "the" include plural referents unless the context clearly dictates otherwise. Thus, for example, reference to an item includes reference to one or more items.

The term "ones" refers to one, two, or more, and generally applies to the selection of some or all of a quantity. The term "plurality" refers to two or more of an item The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, the terms "approximately", "about", and "substantially" may refer to an amount that is within less than 10% of, within less than 5% of, within less than 1% of, within less than 0.1% of, and within less than 0.01% of the stated amount or characteristic. Numbers preceded by a term such as "about" or "approximately" also include the recited numbers. For example, "about 3.5 mm" includes "3.5 mm. For example, the disclosure expressly contemplates being able a value or range proceeded by a term such as "about" or "approximately" in this disclosure with or without such term.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. As another illustration, a numerical range of "about 1 to about 5" would also include the embodiment of a range of "1 to 5." This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The invention claimed is:

1. A deployable antenna, comprising:
    an outer frame;
    a hub;
    one or more struts connecting the outer frame to the hub;
    a net mesh supported by the outer frame, wherein the net mesh comprises a plurality of nodes, and a plurality of tension elements coupled to the nodes, wherein the tension elements coupled between the net mesh and the hub; and
    a reflective surface supported by the net mesh.

2. The deployable antenna of claim 1, further comprising a plurality of enclosures for containing at least portions of the tension elements in a collapsed configuration.

3. The deployable antenna of claim 2, wherein the plurality of enclosures comprises tubes.

4. The deployable antenna of claim 2, wherein the plurality of enclosures are deformable.

5. The deployable antenna of claim 2, wherein each of the plurality of tension elements are positioned within two enclosures in a stored configuration.

6. The deployable antenna of claim 1, wherein the outer frame and/or one or more struts comprise a shape memory material.

7. The deployable antenna of claim 1, wherein the tension elements are under tension in a deployed configuration.

8. The deployable antenna of claim 1, wherein the outer frame and one or more struts defines an outer envelope for which the reflective surface is fully contained.

9. The deployable antenna of claim 1, wherein the outer frame defines a toroid in a deployed configuration.

* * * * *